United States Patent [19]
Stephenson

[11] Patent Number: 5,909,248
[45] Date of Patent: *Jun. 1, 1999

[54] EXPOSURE CONTROL OF CAMERA ATTACHED TO PRINTER ELECTRONIC CAMERA

[75] Inventor: Stanley W. Stephenson, Rochester, N.Y.

[73] Assignee: Eastman Kodak Company, Rochester, N.Y.

[*] Notice: This patent is subject to a terminal disclaimer.

[21] Appl. No.: 08/792,499

[22] Filed: Jan. 31, 1997

[51] Int. Cl.⁶ .................................................. H04N 5/225
[52] U.S. Cl. .......................................... 348/373; 348/207
[58] Field of Search ..................... 348/373, 335, 348/207; 358/906, 909.1; 396/374

[56] References Cited

U.S. PATENT DOCUMENTS

| | | | |
|---|---|---|---|
| 4,161,749 | 7/1979 | Erlichman | 358/909.1 |
| 4,827,347 | 5/1989 | Bell | 358/906 |
| 4,937,676 | 6/1990 | Finelli et al. | 358/906 |
| 5,164,751 | 11/1992 | Weyer | 396/374 |
| 5,715,492 | 2/1998 | Stephenson | 358/909.1 |
| 5,742,861 | 4/1998 | Stephenson | 358/906 |

*Primary Examiner*—Wendy Garber
*Assistant Examiner*—Luong Nguyen
*Attorney, Agent, or Firm*—Raymond L. Owens

[57] ABSTRACT

Apparatus for capturing and printing images on photosensitive sheets, includes a camera for electronically storing an image of a subject and having a display for displaying such stored image. A printer includes light tight storage arrangement for receiving a stack of photosensitive sheets and receives an inserted camera to interconnect such camera to the printer and open a light tight optical path between the photosensitive sheets and the electronic camera display. After the camera is inserted into the printer, exposure takes place along the light tight optical path to a photographic surface of a sheet with an image from the electronic camera display.

9 Claims, 5 Drawing Sheets

EXPOSURE CONTROL OF CAMERA ATTACHED TO PRINTER ELECTRONIC CAMERA

CROSS REFERENCE TO RELATED APPLICATIONS

The present invention is related to U.S. patent application Ser. No. 08/792,341 filed simultaneously herewith, entitled "Electronic Camera and Associated Printer With Light Shutter", to et al assigned to the assignee of the present invention. The disclosure of this related application is incorporated herein by reference.

FIELD OF THE INVENTION

The present invention relates to electronic cameras and to the printing of images produced by such cameras.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera A shortcoming with prior electronic cameras is that data must be transmitted from the electronic camera to printer. Interfaces must be present to transfer the data. As disclosed in U.S. Pat. No. 5,032,911, printers that write to light sensitive media print must have a structure within the printer that operates on received data and converts the data into modulated light to mark the photosensitive sheet Many newer electronic cameras incorporate light emitting displays to view a captured image. However, the apparatus for producing images from such displays is not available for light writing onto photosensitive media.

SUMMARY OF THE INVENTION

It is an object of the present invention to make use of an electronic image display in an electronic camera to write directly onto light sensitive media which can effectively provide a hard copy.

This object is achieved by apparatus for capturing and printing images on photosensitive sheets, comprising:
  (a) a camera for electronically storing an image of a subject and having a display for displaying such stored image;
  (b) a printer including light tight storage means for receiving a stack of photosensitive sheets and camera receiving means which are adapted to receive a camera after it is inserted into the receiving means to interconnect said camera to said printer and open a light tight optical path between said photosensitive sheets and said electronic camera display; and
  (c) exposure means operatively associated with the camera being inserted into the printer for exposing along the light tight optical path a photographic surface of a sheet with an image from the camera display.

Advantages

A feature of this invention is that a camera display is used to directly write onto the light sensitive sheet The printer employs a simple, inexpensive shuttering mechanism to protect and expose the media. Interconnection between the printer and the camera permits a light-tight interconnection between said printer and said camera. Media shuttering is accomplished by mechanical interconnection of the camera and printer. Sensing means in the camera are responsive to the printer to control operation of the camera display to produce an image on the photosensitive sheet.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics is disposed in each device and data representing the image is transmitted from the electronic camera to the printer.

Figure 1:
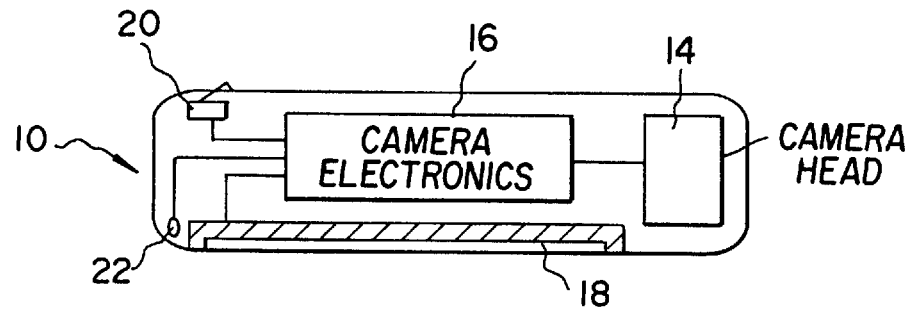
FIG. 1 is a top sectional view of an electronic camera which is adapted to be coupled to a printer in accordance with the present invention.
Figure 2:
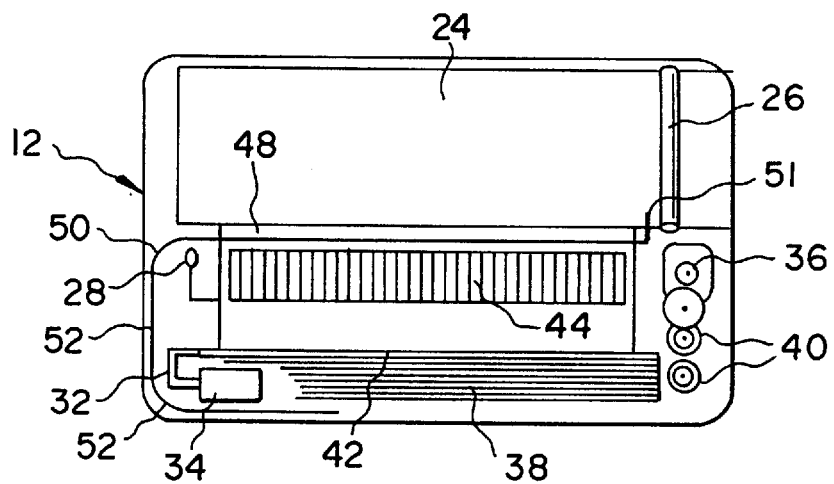
FIG. 2 is a top sectional view of the printer which is adapted to be coupled to the electronic camera of FIG. 1.

Turning now to FIG. 1, an electronic camera 10 is shown, and to FIG. 2 where a printer 12 is shown. Electronic camera 10 is of conventional design and can capture either still or motion images. The electronic camera being adapted to electronically store an image of a subject and having a camera display 18 for displaying such stored image. Images are captured by camera head 14 and transferred to camera electronics 16. Camera electronics 16 is capable of displaying still images on camera display 18. Camera display 18 can be for instance a LCD or organic polymer display system of conventional design.

Electronic camera 10, in accordance with the present invention, includes the additional modification of a printer sensor 20 for determining that electronic camera 10 is entering the printer 12. Printer sensor 20 can be a simple switch that is depressed as electronic camera 10 enters camera bay 24 in printer 12. Camera electronics 16 deactivates camera display 18 when printer sensor 20 is depressed. A light sensing camera link 22 is disposed to receive data from printer 12.

Figure 3:
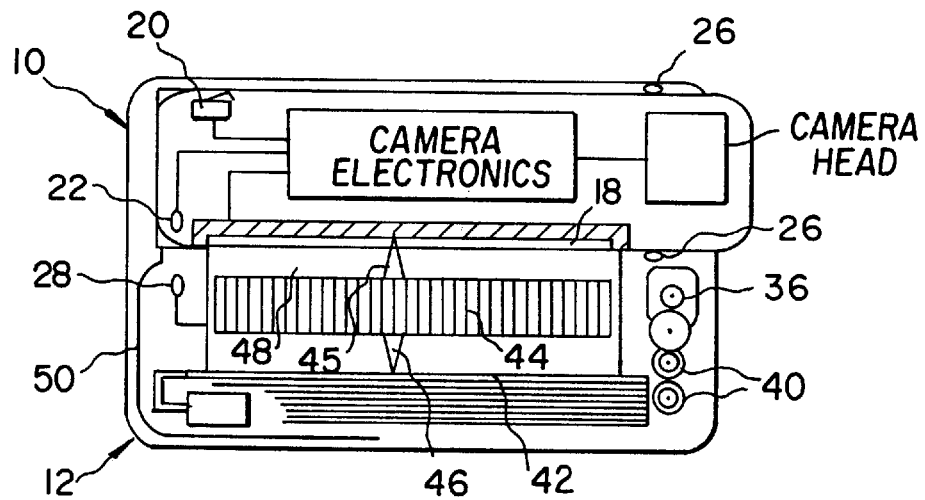
FIG. 3 shows the printer of FIG. 2 attached to the camera of FIG. 1.
Figure 4:
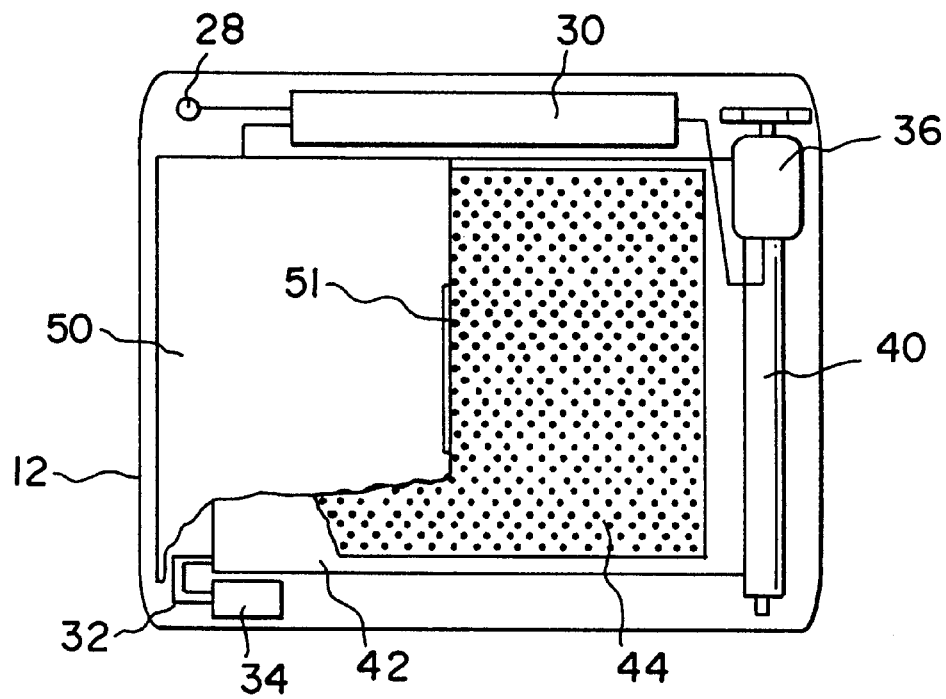
FIG. 4 is a front sectional view showing portions of the printer of FIG. 2.
Figure 5:
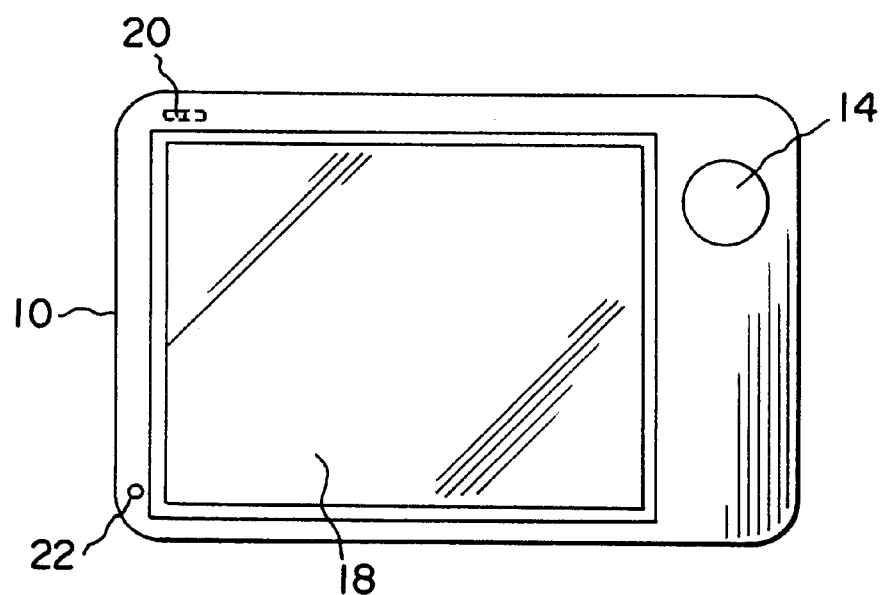
FIG. 5 is a rear view of the electronic camera shown in FIG. 1.

The printer 12 includes a light tight storage structure for receiving a stack of photosensitive sheets disposed relative to a camera opening as will be described shortly. Printer 12 has light emitting printer link 28 that transmits control signals from printer 12 to electronic camera 10 through camera link 22. Transmission between printer 12 and electronic camera 10 is enabled when electronic camera 10 is fully inserted into camera bay 24. The rear view of the camera 10 in FIG. 5 shows the position of the camera link 22, printer sensor 20 (hidden) and camera display 18. A compliant, light tight seal 26 is disposed at the entrance of camera bay 24. Insertion of electronic camera 10 into camera bay 24 is detected by printer sensor 20. The change of state by printer sensor 20 causes camera electronics 16 to extinguish camera display 18. Extinguishing camera display 18 creates a light tight, darkened camera bay 24. FIG. 3 shows electronic camera 10 fully inserted into printer 12.

Printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

Figure 6A:
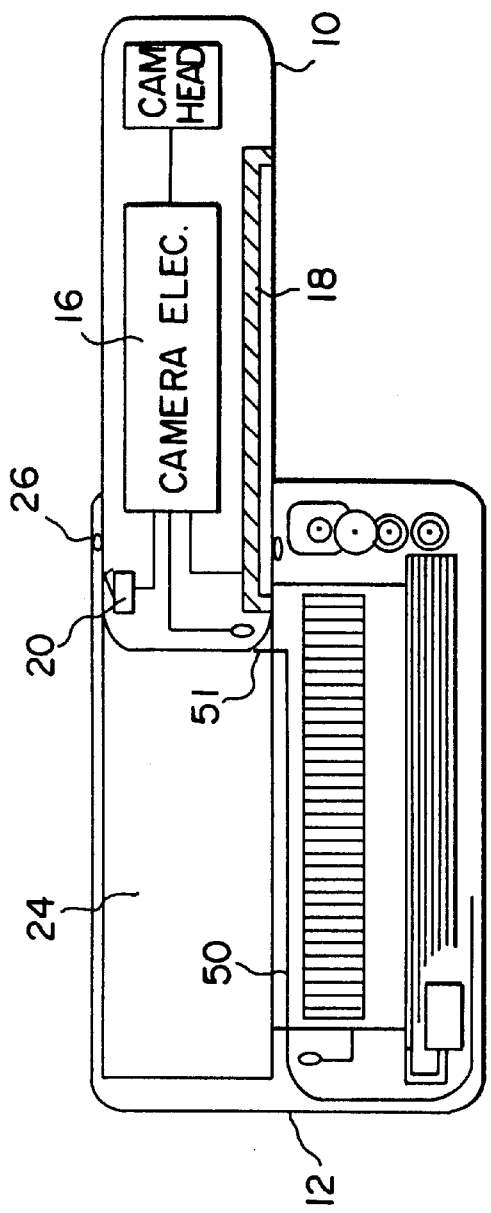
FIGS. 6a, 6b, and 6c show an operating sequence of the camera printer arrangement.
Figure 6B:
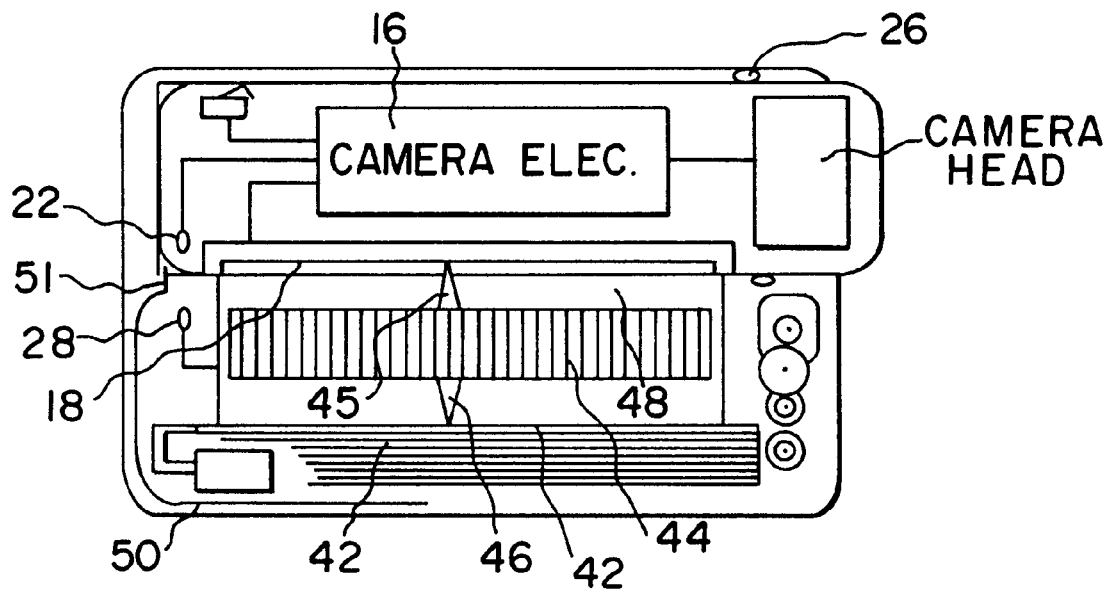

Light from the camera display 18 passes through a printer opening 48 to permit light to fall onto photosensitive sheet 42 within the printer 12. A shutter member 50 prevents photosensitive sheet 42 from exposure by covering printing opening 48. Shutter member 50 is a light opaque, compliant sheet that is free to travel shutter path 52 formed within printer 12. Shutter member 50 can be a 200 micron thick sheet of stainless steel, which has a black oxide plating. The use of stainless steel provides a light tight cover that is flexible. A black oxide coating or paint prevent flare light from fogging photosensitive sheet 42. As shown in FIG. 6a, the shutter member 50 is a flexible light-opaque sheet which, when the shutter member 50 is in its first position, over the photosensitive surface of the sheet. When the shutter member 50 is moved to its second, or open, position, it is driven along a shutter path 52 so that it no longer covers the photosensitive surface of the sheet. As shown in FIG. 6b, the shutter member 50 is actually moved to a position where much of it is under the sheet furthest from the opening. The printer has a printer opening 48 disposed relative to the camera display 18 for permitting light images from the camera to pass through the printer opening 48 and expose a photosensitive surface of a photosensitive sheet 42. The shutter member 50 is disposed relative to the printer opening and is movable between the first sheet covering position and the second sheet exposing position. Shutter member 50 is further compliantly loaded (means not shown) to a position that covers printer opening 48.

Shutter member 50 further incorporates shutter detail 51. Shutter detail 51 protrudes into camera bay 24 near the entrance of camera bay 24. Shutter detail 51 is formed to engage electronic camera 10 as electronic camera 10 enters camera bay 24. Shutter detail 51 is positioned so that shutter member 50 begins opening only after electronic camera 10 has passed through seal 26. Shutter member 50 continues to move to uncover printer opening 48 as electronic camera 10 continues to move through camera bay 24. The motion of electronic camera 10 is stopped when camera link 22 is aligned with printer link 28. At the stopped position, shutter member 50 has fully uncovered printer opening 48 in darkened, light tight camera bay 24. Shutter path 52 guides shutter member 50 in a path around the media to provide a small printer size.

Printing optic 44 is used to focus an image onto photosensitive sheet 42. The printing optic 44 focuses a display area from the camera display 18 onto a photosensitive surface of the sheet 42 nearest the opening. After the shutter member 50 is moved to its second, or exposing, position. Printing optic 44 can be formed from Nippon Sheet Glass rod lens array type 20B which has a total conjugate 15.1 mm. The actual element is 6.89 mm tall and first working distance 45 and second working distance 46 are 4.10 mm.

The location of electronic camera 10 in camera bay 24 is dimensionally controlled to align printing optic 44 with the light emitting elements of camera display 18. First working distance 45 is located to focus on the light emitting elements of camera display 18. Second working distance 46 is provided for forming an image on the imaging receiving surface of photosensitive sheet 42. Printing optic 44 is accurately positioned relative to the display when the printer is secured to the electronic camera 10.

Signals from printer electronics 30 are transmitted through printer link 28 to camera link 22. The control signals are received by camera electronics 16. Camera electronics 16 turns camera display 18 on and off under the control of printer electronics 30. Signals from printer electronics 30 operate through the communication link to cause camera electronics 16 to activate camera display 18. A second transmission from printer electronics 30 turns camera display 18 off to prevent further exposure of photosensitive sheet 42. After this exposure, photosensitive sheet 42 is urged by picker 32 into processing rollers 40. Processing rollers 40 are turned by process roller drive 36 to process the latent image formed on photosensitive sheet 42.

In the case of silver halide imaging, a pod of chemicals at the beginning of photosensitive sheet 42 is burst by processing rollers 40. The chemicals are spread across the image of photosensitive sheet 42 as photosensitive sheet 42 passes through processing rollers 40. Said chemicals operate on the latent image to create a permanent color image on photosensitive sheet 42. In the case of crushable media, the rollers apply pressure to micro-beads containing the latent image. Burst micro-beads release dye chemistries onto photosensitive sheet 42 to create a permanent color image.

Figure 6C:
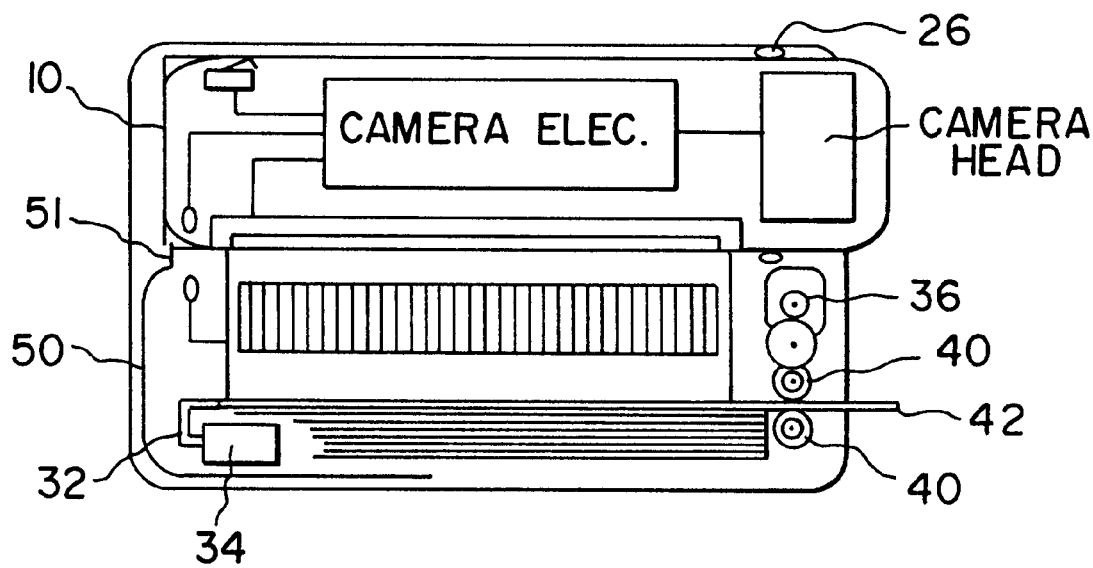

Operation of the invention is shown in FIGS. 6a–6c. An operator inserts electronic camera 10 into camera bay 24. Seal 26 surrounds the body of electronic camera 10, creating a light tight seal for camera bay 24. Camera bay 24 is depressed as electronic camera 10 enters camera bay 24. Camera electronics 16 acts on the signal from camera bay 24 and turns off camera display 18. As the camera continues to enter camera bay 24, electronic camera 10 engages shutter detail 51 and begins to force shutter member 50 through shutter path 52 and expose printer opening 48. In FIG. 6b, electronic camera 10 has been fully seated in camera bay 24. In the darkness, camera display 18 and photosensitive sheet 42 face each other through printing optic 44. Printer link 28 is aligned with camera link 22. Printer electronics 30 signals camera electronics 16 turn camera display 18 on for a time period providing proper exposure of photosensitive sheet 42. Printer electronics 30 is aware of the light sensitivity of photosensitive sheet 42 and sets exposure time correspondingly.

FIG. 6c shows the system after exposure of photosensitive sheet 42. Camera display 18 has been turned off by camera electronics 16. Picker 32 moves under the actuation of picker drive 34 to move photosensitive sheet 42 into rotating processing rollers 40. Processing rollers 40 grip and drive photosensitive sheet 42 out of printer 12, providing the operator with a color record of camera display 18.

Electronic camera 10 can be extracted from camera bay 24 without interaction with printer 12. As electronic camera 10 moves out of camera bay 24, shutter member 50 follows the motion of camera 10, being continuously urged to press shutter detail 51 against the body of electronic camera 10. Shutter member 50 has completely sealed printer opening 48 before the body of electronic camera 10 has cleared seal 26.

Figure 7:
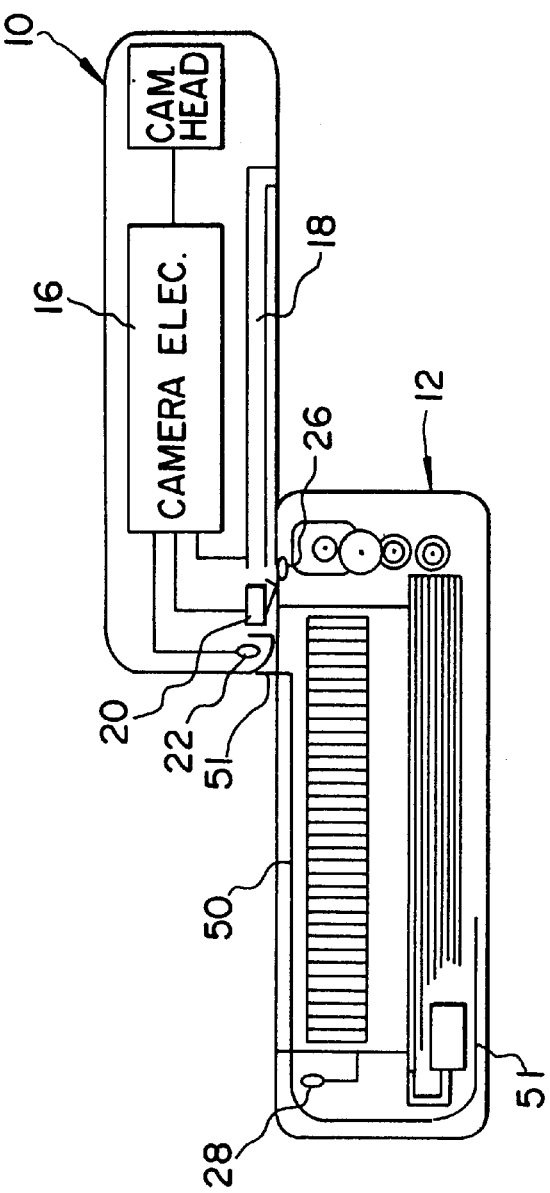
FIG. 7 is a top sectional view of another embodiment of the present invention and printer being connected to the camera.

FIG. 7 is another embodiment of the invention. Camera bay 24 is omitted in this embodiment Camera 10 has been modified so that printer sensor 20 detects the start of attachment of camera 10 to printer 12. As in the first embodiment, printer sensor 20 on camera 10 changes state as camera 10 is brought to an initial attachment position to printer 12. Camera electronics 16 responds to the change in printer sensor 20 and extinguishes camera display 18. Seal 26 is adapted to provide a light tight seal between camera 10 and printer 12 at the initial attachment position of camera 10 to printer 12.

Shutter member 50 is compliantly urged to cover printer opening 48 in a light tight manner. Shutter detail 51 is on shutter member 50 and has a compliant, light tight seal that engages a surface of camera 10 in a light tight manner as camera 10 is brought into the initial attachment position with respect to printer 12. The seal on shutter detail 51 and seal 26 cooperate to form a light tight seal for photosensitive sheet 42 as camera 10 continues move across printer opening 48. Camera 10 can be brought into a final interconnection position on printer 10 without need for detail to form camera bay 24.

Figure 8A:
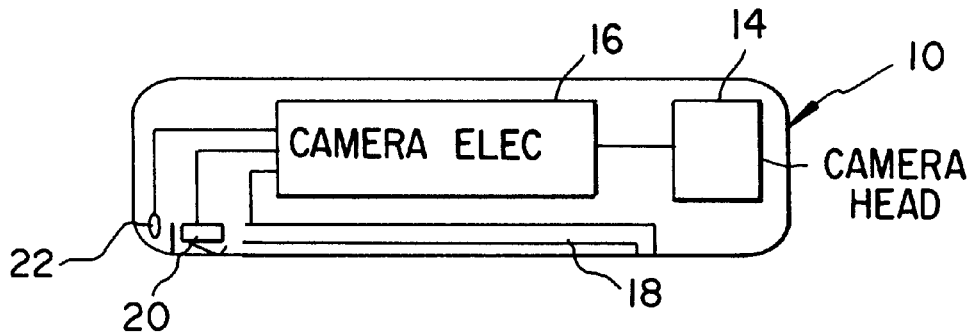
FIGS. 8a, 8b, and 8c show operating sequence of the camera printer arrangement in FIG. 7.
Figure 8B:
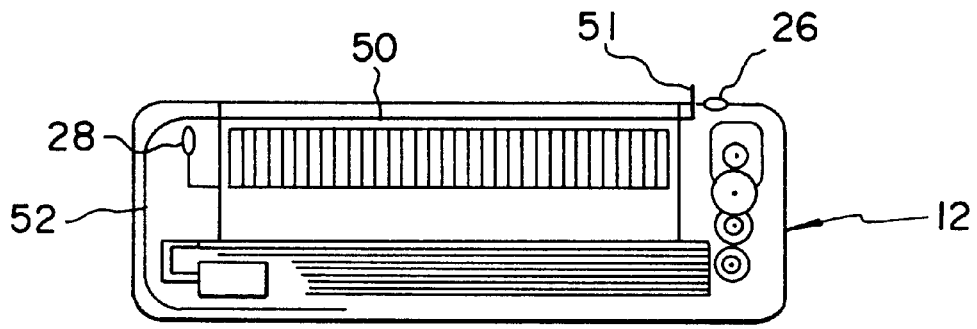
Figure 8C:
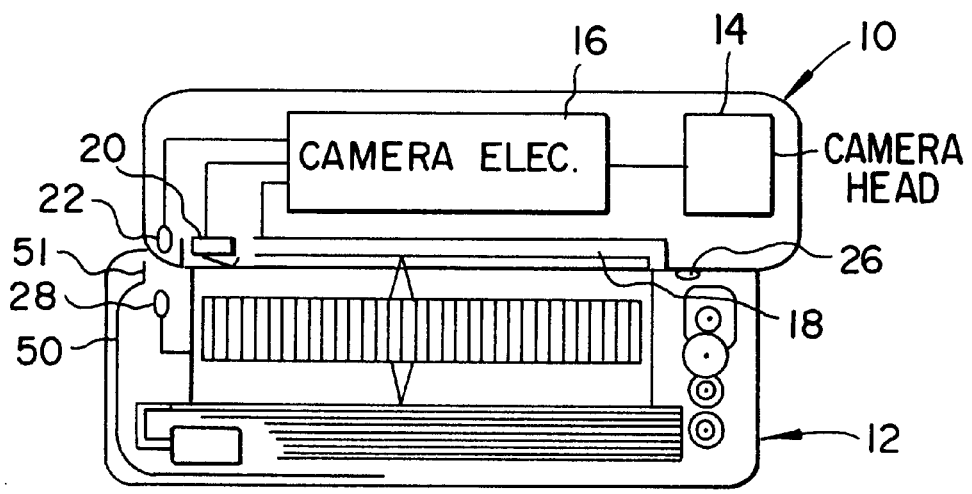

FIG. 8c shows the camera 10 fully attached to printer 12. Camera 10 has slid laterally across printer 12 on light-tight interconnecting mechanical rails (not shown) formed on both printer 12 and camera 10. The motion of camera 10 against the compliant force on shutter 50 maintains the light tight seal as printer 12 crosses printer opening 48. Alignment of camera link 22 and printer link 28 at the fully attached position permits printer electronics 30 to cooperate with camera electronics 16 using camera link 22 and printer link 28 to expose and process photosensitive sheet 42.

The invention has been described in detail with particular reference to certain preferred embodiments thereof, but it will be understood that variations and modifications can be effected within the spirit and scope of the invention.

Parts List 10 electronic camera
12 printer
14 camera head
16 camera electronics
18 camera display
20 printer sensor
22 camera link
24 camera bay
26 seal
28 printer link
30 printer electronics
32 picker
34 picker drive
36 roller drive
38 media sheets.
40 processing rollers
42 photosensitive sheet
44 printing optic
45 first working distance
46 second working distance
48 printer opening
50 shutter member
51 shutter detail
52 shutter path

I claim:

1. Apparatus for capturing and printing images on photosensitive sheets, comprising:

(a) a camera for electronically storing an image of a subject and having a display for displaying such stored image;

(b) a printer including light tight storage means for receiving a stack of photosensitive sheets and camera receiving means which are adapted to receive a camera after it is inserted into the receiving means to interconnect said camera to said printer and open a light tight optical path between said photosensitive sheets and said electronic camera display; and (c) exposure means operatively associated with the camera being inserted into the printer for exposing along the light tight optical path a photographic surface of a sheet with an image from the camera display.

2. The apparatus of claim 1 wherein:

the exposure means for imaging the display image onto photosensitive sheets includes:

(i) the printer having a printing opening;

(ii) shutter means operated by the insertion of the camera into the camera receiving means to move said shuttering means between a first sheet covering position and a second sheet exposing position; and (ii) optical means for focusing a display area onto said photosensitive sheet after the shutter means is moved to its second position.

3. The apparatus of claim 2 further including display actuating means for providing electronic communication between the electronic camera and the printer to cause a desired image to be displayed on the display for exposing the display image onto the photosensitive sheet.

4. The apparatus of claim 2 wherein the display actuating means includes means for sensing a camera being inserted into the receiving means and for activating the display and for deactivating the display after a predetermined time period.

5. The apparatus of claim 1 wherein the said camera includes means for sensing interconnection between said camera and said printer and further includes electronic sensing circuitry for communicating with the printer.

6. The apparatus of claim 1 further including means for preventing the printer unit from being detached from the camera when there is electronic communication between the display and a print head.

7. The apparatus of claim 1 wherein an optical means includes rod lens arrays.

8. The apparatus of claim 2 wherein said shutter means includes a shutter member comprising a flexible light-opaque sheet which, when the shutter member is moved to its second position, it is driven along a shutter path so that it no longer covers the photosensitive surface of the sheet.

9. Apparatus for capturing and printing images on photosensitive sheets, comprising:

(a) a camera for electronically storing an image of a subject and having a display for displaying such stored image;

(b) a printer including light tight storage means for receiving a stack of photosensitive sheets and camera receiving means which are adapted to receive a camera after it is inserted into the receiving means to interconnect said camera to said printer and provides a light tight optical path between said photosensitive sheets and said electronic camera display; and (c) exposure means operatively associated with the camera being inserted into the printer for exposing a photographic surface of a sheet with an image from the camera display and including display actuating means for sensing a camera being inserted into the receiving means and for activating the display and for deactivating the display after a predetermined time period.

* * * * *